United States Patent
Junker

(10) Patent No.: US 9,715,664 B2
(45) Date of Patent: Jul. 25, 2017

(54) DETECTING MISSING RULES WITH MOST GENERAL CONDITIONS

(75) Inventor: Ulrich M. Junker, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 1287 days.

(21) Appl. No.: 13/445,149

(22) Filed: Apr. 12, 2012

(65) Prior Publication Data

US 2013/0166483 A1 Jun. 27, 2013
US 2017/0046631 A9 Feb. 16, 2017

Related U.S. Application Data

(63) Continuation of application No. 13/333,063, filed on Dec. 21, 2011, now Pat. No. 9,020,872.

(30) Foreign Application Priority Data

Dec. 21, 2010 (EP) .................................. 10306464

(51) Int. Cl.
| | |
|---|---|
| G06N 5/00 | (2006.01) |
| G06Q 10/00 | (2012.01) |
| G06F 19/00 | (2011.01) |
| G06N 5/02 | (2006.01) |
| G06Q 10/10 | (2012.01) |

(52) U.S. Cl.
CPC .............. G06Q 10/00 (2013.01); G06F 19/00 (2013.01); G06N 5/00 (2013.01); G06N 5/025 (2013.01); G06Q 10/103 (2013.01)

(58) Field of Classification Search
CPC ................................ G06N 5/00; G06N 99/005
See application file for complete search history.

(56) References Cited

U.S. PATENT DOCUMENTS

| | | |
|---|---|---|
| 5,259,066 A | 11/1993 | Schmidt |
| 5,724,573 A | 3/1998 | Agrawal et al. |
| 6,278,997 B1 | 8/2001 | Agrawal et al. |
| 6,965,887 B2 | 11/2005 | Huelsman et al. |
| 7,020,869 B2 | 3/2006 | Abrari et al. |
| 7,058,910 B2 | 6/2006 | Bharadwaj et al. |
| 7,188,091 B2 | 3/2007 | Huelsman et al. |

(Continued)

OTHER PUBLICATIONS

Marlowe, T.J., and Stephen P. Masticola, "Safe optimization for hard real-time programming", Proc. IEEE 2nd Int'l Conf. on Systems Integration, 1992, pp. 436-445.*

(Continued)

*Primary Examiner* — Vincent Gonzales
(74) *Attorney, Agent, or Firm* — Yee & Associates, P.C.; Stephen Yoder

(57) ABSTRACT

A technique for detecting missing rules (mr) with most general conditions in a rule project (1) having a given scope with a fixed number of objects of a given type, wherein each rule (r) is defined by at least one test (t) in respect to at least one condition of at least one attribute (age, value) of the object, the method comprising the steps of finding at least one missing case not covered by the rules (r), identifying a list of tests (t) that occur in the rules (r), generalizing the missing case into a family of missing cases (mc) in terms of the tests (t) occurring in the rules (r), generalizing the family of missing cases (mc) into a missing rule (mr), and generating missing rules (mr) with most general conditions.

9 Claims, 13 Drawing Sheets

(56) References Cited

U.S. PATENT DOCUMENTS

| | | |
|---|---|---|
| 7,565,642 B2 | 7/2009 | Moore et al. |
| 2002/0049720 A1 | 4/2002 | Schmidt |
| 2011/0082826 A1 | 4/2011 | Junker |
| 2012/0158628 A1 | 6/2012 | Junker |
| 2012/0215731 A1 | 8/2012 | Junker |

OTHER PUBLICATIONS

Office Action, dated Sep. 22, 2014, regarding U.S. Appl. No. 13/333,063, 11 pages.
Office Action, dated May 21, 2014, regarding U.S. Appl. No. 13/333,063, 24 pages.
Preece, "A new approach to database detecting missing knowledge in expert system rule bases," Int. J. Man-Machine Studies, vol. 38, Apr. 1993, pp. 661-688.
Junker, "Method and System for Detecting Missing Rules with Most General Conditions," U.S. Appl. No. 13/333,063, filed Dec. 21, 2011, 52 pages.
Junker, "QuickXplain: Preferred Explanations and Relaxations for Over-Constrained Problems," Proceedings of the Nineteenth National Conference on Artificial Intelligence (AAAI-04), Jul. 2004, pp. 167-172.
Mitchell et al., "Explanation-Based Generalization: A Unifying View," Machine Learning, vol. 1, Issue 1, 1986, pp. 47-80.
Sinz et al., "Configuration," Trends & Controversies, IEEE Intelligent Systems, vol. 22, Issue 1, Jan.-Feb. 2007, pp. 78-90.
Van Raalte et al., "User's Guide for Oracle Business Rules," Oracle Fusion Middleware, 11g Release (11.1.1), E10228-01, May 2009, 332 pages.
IBM, "IBM WebSphere ILog JRules," Version 7.0.1, copyright 2009, 31 pages, accessed Jan. 10, 2013 http://pic.dhe.ibm.com/infocenter/brjrules/v7r0/index.jsp.
Notice of Allowance, dated Dec. 23, 2014, regarding U.S. Appl. No. 13/333,063, 5 pages.

\* cited by examiner check of B0, t1,....,t6 fails

B0 t1... t6 | t7... t12 check of B0, t1,...,t5 fails

B0 t1... t5 | t6 check of B0, t1,...,t4 fails

B0 t1... t4 | t5 check of B0, t1,...,t3 succeeds

B0 t1... t3 | t4 check of B0, t1, t2, t4 fails t4 B0 t1,t2 | t3 check of B0, t1, t4 succeeds t4 B0 t1 | t2 check of B0, t2, t4 succeeds t2 t4 B0 t1 original test ordering        ranked test t8: the value is at most 15 t5: the value is at least 10 t4: the age is more than 20 t9: the age is at least 20 t7: the age is more than 15 t11: the age is more than 10 t3: the age is at least 5 t2: the value is at most 20 t12: the value is less than 30 t10: the value is less than 35 t6: the value is at most 35 t1: the age is less than 30 repaired test ordering check succeeds check fails check fails check succeeds check fails check fails check fails check succeeds check fails check fails check fails check succeeds check fails check succeeds

DETECTING MISSING RULES WITH MOST GENERAL CONDITIONS

This application is a continuation of and claims the benefit of priority to U.S. patent application Ser. No. 13/333,063, filed on Dec. 21, 2011 and entitled "Method and System for Detecting Missing Rules with Most General Conditions", which is hereby incorporated by reference.

BACKGROUND

1. Field

The present invention generally relates to rule management systems and specifically to a method and a system for detecting missing rules with most general conditions in a rule project having a given scope with a fixed number of objects of a given type.

2. Description of the Related Art

Business Rule Management (BRM) technology relates to the area of decision-making automation in business problems such as loan approval, insurance claim processing or customer fidelity programs. Respective Business Rule Management Systems (BRMS) are implemented to work with rule projects. BRMS allow rule edition in a controlled natural-like language, which makes it easy to use without specific knowledge on generating rules. The rules can be kept in different versions in a rule repository. The BRMS further allows the execution of the rules by a rule engine, which also performs a rule analysis for detecting conflicting rules, redundant rules, and missing rules. Another feature is rule validation by test and simulation.

Business rules are a convenient way to represent decision-making policies which are making decisions depending on given cases. A case usually consists of a combination of features and a decision may be a combination of elementary choices. A business rule makes a decision by applying an action to a given case. A business rule cannot handle all cases, but only those that satisfy a condition. A business rule thus consists of a condition, which usually is a combination of tests, and an action, which may consist of a sequence of elementary steps. As a business rule treats only certain cases, it defines only a part of the whole decision making process. Further business rules are needed to make a decision for the remaining cases. If the given business rules are making a decision for each relevant case, then such a collection of rules is complete. Otherwise, the rules will not treat every case and further rules need to be added to make the rules complete.

Missing rules arise due to unforeseen interactions between the tests of the existing rules, which may complement each other on certain dimensions but leave gaps on other dimensions. The detection of the conditions of the missing rules is a difficult task as not all dimensions are relevant. If irrelevant conditions are included in missing rules, the rules will be more verbose, less concise and, more importantly, the number of missing rules will be increased in a significant way. Ideally, a missing rule should be as general as possible, i.e. have a minimal set of tests and should not be subsumed by other missing rules.

A close examination of the state-of-the-art established that there is no general exact method for detecting most general missing rules (MGMRs). Existing methods for completeness analysis of BRMS are able to identify missing rules in decision tables of a regular form, but are neither able to transform these missing rules into the most general form, nor to achieve these tasks for arbitrary decision tables and arbitrary business rule projects. Indeed, they handle the simple case where each expression of the decision table has a partitioning of its domain into a finite set of sub-domains or ranges. Each cell in the decision table either has a "don't care" condition or it tests whether its expression belongs to one of the sub-domains. As the sub-domains do not overlap, two different tests concerning the same expression cannot be both true. Moreover, the rules of such a decision table are organized in a tree-like manner by merging cells that have the same test and the same parent cell.

The completeness analyzer described in U.S. Pat. No. 7,020,869 identifies missing branches in this tree, but is not capable of transforming these branches into a reduced number of missing rules by replacing irrelevant tests by don't care values. Indeed, it has to apply the inverse operation, namely to expand existing "don't care" cells by duplicating sub-trees before being able to perform the completeness analysis. Moreover, this method is insufficient to handle decision tables with overlapping tests or to find missing cases in arbitrary business rule projects where rules differ in their scope, i.e. the number and types of the object they are matching. U.S. Pat. No. 5,259,066 provides a method for constructing consistent and complete rule bases and for revealing missing rules, but is limited to decision tables as well.

The before-mentioned methods achieve the completeness analysis by exploiting properties of the chosen representation (e.g. missing branch in a tree), but do not provide the necessary enginery for bringing missing rules into a most general form. Similar remarks hold for missing rule detection in binary decision diagrams (see U.S. Pat. Nos. 7,058,910, 6,965,887, and 7,188,091).

A previous patent application (Ser. No. 12/898,359 entitled "Satisfiability For Detecting Missing Cases In Incomplete Business Rules Projects" of the same inventor) shows how to find missing cases and missing case families of a fixed scope, i.e. of a fixed number of objects of given types, for unrestricted rule projects. It provides methods for handling complex interactions between rules, but not for generalizing the missing cases into most general missing rules.

Known methods on rule compression and rule learning are able to generalize a set of missing cases into missing rules, but achieve this with a limited accuracy only and do not guarantee that the rules are in a most general form (see, for example, http://openrules.com/RuleCompressor.htm and http://openrules.com/RuleLearner.htm). The same remark holds for data mining methods (such as U.S. Pat. No. 5,724,573 and U.S. patent application publication no. 2002/0049720 A1). Other learning methods such as explanation-based generalization are able to learn rule-like concept descriptions which are accurate. Those methods prove a target property for a given example and then generalize the proof in order to extract a rule. They cannot be directly applied to missing rule generalization as no target property is given for this problem. Moreover, if the proof is not optimal and uses parts of the example description that other proofs are not using, then the resulting rule is not in a most general form.

SUMMARY

It is therefore an object of the invention to provide a method, a system, a computer-readable medium, and a computer program product for reliably covering all missing cases in a rules project with a minimum number of missing rules. This object is achieved by the independent claims. Advantageous embodiments are detailed in the dependent claims.

Accordingly, this object is achieved by a method for detecting missing rules with most general conditions in a rule project having a given scope with a fixed number of objects of a given type, whereby each rule is defined by at least one test in respect to at least one condition of at least one attribute of the object, the method comprising the steps of finding at least one missing case not covered by the rules, identifying a list of tests that occur in the rules, generalizing the missing case into a family of missing cases in terms of the tests occurring in the rules, generalizing the family of missing cases into a missing rule, and generating missing rules with most general conditions.

This object is also achieved by a computer-readable media such as a storage device, a floppy disk, compact disc, CD, digital versatile disc, DVD, Blu-ray disc, or a random access memory, RAM, containing a set of instructions that causes a computer to perform one of the above methods and a computer program product comprising a computer-usable medium including a computer-usable program code, wherein the computer-usable program code is adapted to execute one of the above methods.

The object is further achieved by a system for detecting missing rules with most general conditions in a rule project comprising a storage device for storing computer usable program code and a processor for executing the computer usable program code to perform the above method.

Basic idea of the invention is to identify a missing case, which is first generalized into a family of missing cases. The invention addresses multiple difficulties to fulfill this task. Firstly, it identifies a set of relevant tests among the missing-case description which are sufficient for characterizing missing cases. This means that there is no case treated by the rules which satisfies all of these relevant tests. This step of the invention thus provides a mechanism for generalizing the descriptions of missing-case families. The method then uses the set of relevant tests to generate the condition of a missing rule. If the tests of the missing-case description are logically independent, then any of those minimal explanations gives rise to a most-general condition. Accordingly, an amount of missing cases is covered by the most general missing rule, so that the rules project can be kept small with a limited number of missing rules.

The computerized method for generating missing rules is usable for different forms of representations of the rules, namely textual representations, annotated graphs, and object-oriented data structures. As such, the method can be used as a stand-alone reporting tool or integrated into a larger service. In particular, the method can be integrated into an additional functionality of a BRMS which assists a business user in authoring business rules and in reviewing rule projects.

A modified embodiment of the present invention comprises the step of splitting rules having disjunctions in the condition into a set of rules without disjunctions and having the same coverage. Rules having disjunctions can form complex conditions which are difficult to read and of little value and interest for a rule-based project. Disjunction can prevent the generation of missing rules of high generality and quality.

In a preferred embodiment of the present invention the step of generalizing the missing case into a family of missing cases in terms of the tests occurring in the rules comprises ordering the tests according to broadest coverage of the object. Ordering of the tests of the missing case descriptions are performed such that more general tests precede less general ones. It eases the generation of most-general conditions of missing rules even if there are logical dependencies between tests. The combination of test ordering and relevant test detection provides a major improvement according to the invention.

According to a modified embodiment of the present invention, the step of identifying a list of tests that occur in the rules comprises removing irrelevant tests in respect to the family of missing cases. This provides the potential for significantly reducing the number of missing rules in decision tables. It turned out that each removed test has the potential of dividing the number of missing rules by a factor of two in the best case. The irrelevant tests can e.g. be replaced by "don't care" values. Irrelevant tests can be e.g. tests which are derived more than once from different rules or tests, which are unrelated to the missing cases.

In a preferred embodiment of the present invention, the step of generalizing the missing case into a family of missing cases in terms of the tests occurring in the rules comprises finding a minimal set of tests that cover the family of missing cases but do not cover any of the cases covered by the rules. The missing case family is generalized by applying different tests and verifying whether the generalized missing case family includes cases which are already covered by the rules of the rule project. A coverage of cases already covered by other missing rules is irrelevant.

According to a further modified embodiment of the present invention, the step of finding a minimal set of tests that cover the family of missing cases, but do not cover any of the cases covered by the rules, comprises applying a QuickXplain method on the tests. The QuickXplain method, which is explained in detail in the article "QuickXplain: Preferred Explanations and Relaxations for Over-Constrained Problems" authored by the inventor, which is included in the "Proceedings of the Nineteenth National Conference on Artificial Intelligence", AAAI-04, Jul. 25-29, 2004, San Jose, Calif. and published by The AAAI Press of Menlo Park, Calif., ISBN 978-0-262-51183-4, computes a minimal conflict, i.e. a minimal set of tests, from a given foreground that are conflicting under given background constraints. Hence, the background constraints have no solution that satisfies all the tests in the conflict, but when we remove an arbitrary test from the conflict, then the background constraints have at least one solution that satisfies the remaining tests. Therefore, all the tests in the conflict are relevant for describing a missing-case family as the removal of any of them would include a treated case. QuickXplain solves the conflict minimization problem by successively decomposing it into smaller problems by moving constraints from the foreground to the background. Each of the subproblems thus has a proper foreground and a proper background. When solving a subproblem, QuickXplain first checks whether its background is satisfiable, i.e. has a solution. If this check fails, then none of the foreground constraints need to be added to obtain an inconsistency and QuickXplain returns the empty set as the resulting conflict. If the background is satisfiable, then some of the foreground constraints belong to the resulting conflict. If the foreground consists of a single test, then this test is a culprit, i.e. belongs to the resulting conflict. As the foreground contains no other test, QuickXplain returns the set that contains the detected culprit as the resulting conflict.

In a modified embodiment of the present invention, the step of finding a minimal set of tests that cover the family of missing cases, but do not cover any of the cases covered by the rules, comprises the step of stepping through the ordered tests starting with the test having the least broadest coverage of the object and verifying if the selected test covers any case covered by the rules. When more general tests precede less general ones, the missing case family can subsequently be amplified by stepping through the ordered tests. The task of ordering the tests can also interleave with the task of generalizing the missing case family, thus allowing both tasks to exchange intermediate results. This interleaved processing assures a generation of most-general conditions of missing rules, even if there are logical dependencies between tests. Hence, the resulting missing rule consists of tests that describe only missing cases and there are no other such combinations of tests that include additional missing cases.

According to a preferred embodiment of the present invention, the step of finding a minimal set of tests that cover the family of missing cases, but do not cover any of the cases covered by the rules, comprises separating the tests into two groups and verifying if the one group of the tests creates an overlap with existing rules and, in case no overlap is created, taking solely this group of tests for further processing. The success of this step depends on the number of tests available. The more tests are used within the rules, the higher the probability that the respective group does not create an overlap and the number of tests to be evaluated can be significantly reduced. This step can also be applied recursively, until the respective group of tests creates an overlap.

In a modified embodiment of the present invention, the step of finding a minimal set of tests that cover the family of missing cases, but do not cover any of the cases covered by the rules, comprises applying a timeout at the beginning of the step and taking the current set of tests as minimal set of tests at expiry of the timeout. The method can be iterated and is thus able to find missing rules that handle all the missing cases. If the method does not run into a timeout, it guarantees that the conditions of the generated missing rules are as general as possible. If it runs into a timeout, it still guarantees that the generated missing rules handle all the missing cases. However, the timeout limits the processing time, which is most satisfactory for a user.

According to a preferred embodiment of the present invention, the above method is applied to all missing cases of the rules project. Therefore, the entire set of objects can be covered to identify rules for the entire scope defined by the objects.

In a further modified embodiment of the present invention, the step of finding at least one missing case not covered by the rules comprises finding at least one missing case not covered by the rules of the rules project and already identified missing rules. Accordingly, also cases that are already covered by any of the identified missing rules are not considered as missing cases, so that no additional missing rule is identified based on this case.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

DETAILED DESCRIPTION

Figure 1:
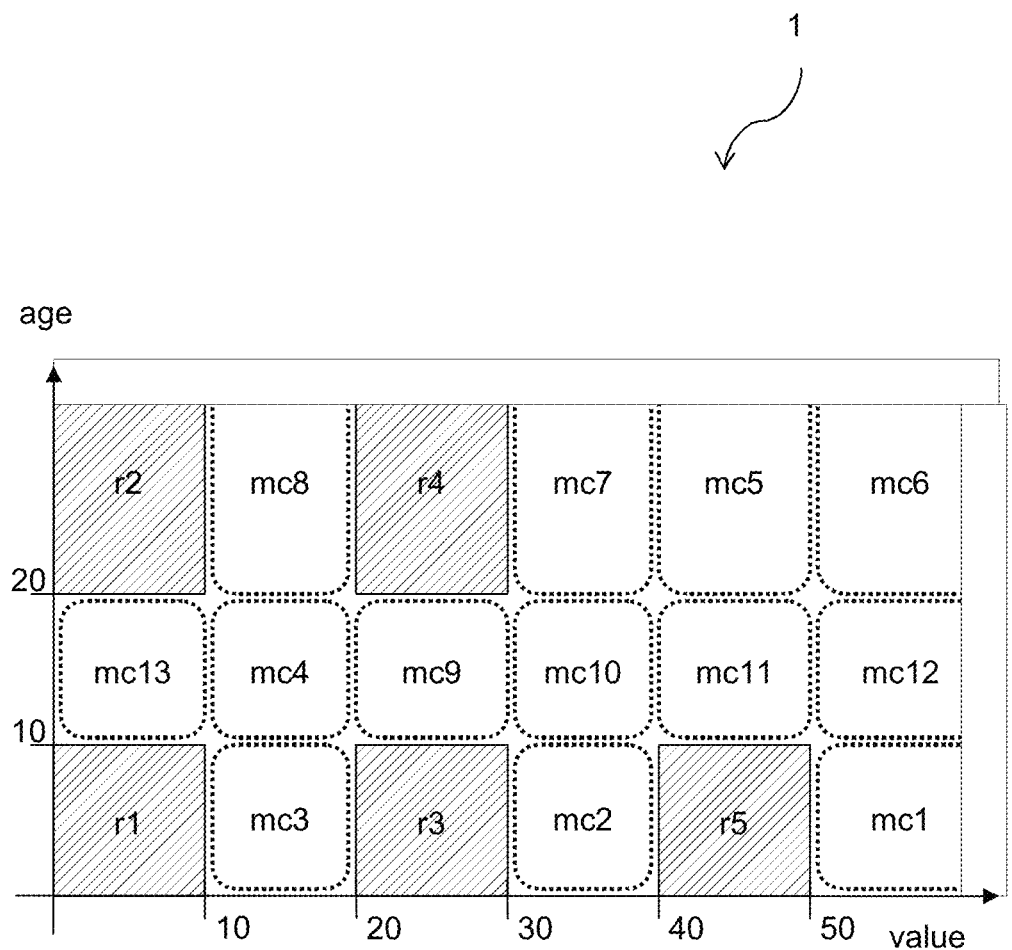
FIG. 1 shows a graphical representation of a first rule project with two objects and identified missing case families based on tests from the rules.

Referring now to FIG. 1, a first exemplary rule project 1 with one object, which refers to a customer and has two attributes, which are by way of example age and value, can be seen. This is used to describe the general idea of the present invention.

The rule project 1 comprises a set of five rules r, which are denoted in this exemplary rule project 1 by r1 to r5, since they can be distinguished by their coverage of the objects. The rule project 1 involves single rules r with an arbitrary nesting of disjunctions, conjunctions, and negations. One example of these rules r is given below:
if (the age of the customer is at least 20 and
the value of the customer is at most 10) or
(the age of the customer is at most 10 and
the value of the customer is at least 20 and
the value of the customer is at most 30)
then set the category of the customer to "Gold".

As those complex conditions are difficult to understand and to maintain, it is preferable to split disjunctive conditions into multiple rules, as shown below.
if the age of the customer is at least 20 and
the value of the customer is at most 10
then set the category of the customer to "Gold".
if the age of the customer is at most 10 and
the value of the customer is at least 20 and
the value of the customer is at most 30
then set the category of the customer to "Gold".

After removing the disjunctions, the rules project 1 comprises five business rules r1 to r5, which treat five separate families of cases which correspond to five rectangular regions, as shown in FIG. 1. The entire rule project 1 comprising the rules r1 to r5 after being split up is shown below:
r1
if the age of the customer is at most 10 and
the value of the customer is at most 10
then set the category of the customer to "Silver";
r2
if the age of the customer is at least 20 and
the value of the customer is at most 10
then set the category of the customer to "Gold";
r3
if the age of the customer is at most 10 and
the value of the customer is at least 20 and
the value of the customer is at most 30
then set the category of the customer to "Gold";
r4
if the age of the customer is at least 20 and
the value of the customer is at least 20 and
the value of the customer is at most 30
then set the category of the customer to "Platinum";
r5
if the age of the customer is at most 10 and
the value of the customer is at least 40 and
the value of the customer is at most 50
then set the category of the customer to "Platinum";

As the scope consists of a single object with two attributes, the rules r may only match this object, which results into thirteen families of missing cases mc, as also indicated in FIG. 1 and denoted mc1 to mc13. The missing cases within a missing case family mc all assign the same truth values to tests t that occur in the different business rules r. For example, the missing case family mc1 contains all missing cases of the given scope that satisfy the following tests t:
Customer1 is a Customer (in the working memory)
the age of Customer1 is at most 10
the value of Customer1 is more than 10
the age of Customer1 is at most 20
the value of Customer1 is more than 20
the value of Customer1 is more than 30
the value of Customer1 is more than 40
the value of Customer1 is more than 50

None of the cases that are effectively treated by the rule project 1 belongs to the missing case family mc1, meaning that each of the treated cases violates at least one of the tests t in the list above.

A missing rule mr that treats the missing cases in the missing case family mc1 can be created by introducing a conjunction of those tests t and use it as the condition of a missing rule mr. The first test t states that the object "Customer1" has the type Customer and is in the working memory. This particular test t is transformed into a definition-clause. As nothing is known about the action, a placeholder is used.

Definitions: set Customer1 to a Customer
if the age of Customer1 is at most 10
and the value of Customer1 is more than 10
and the age of Customer1 is at most 20
and the value of Customer1 is more than 20
and the value of Customer1 is more than 30
and the value of Customer1 is more than 40
and the value of Customer1 is more than 50
then <action>.

As this rule r matches a single customer object, renaming the matched object "Customer1" into "the customer" allows the suppression of the definition-clause without changing the meaning of the rule r:
if the age of the customer is at most 10
and the value of the customer is more than 10
and the age of the customer is at most 20
and the value of the customer is more than 20
and the value of the customer is more than 30
and the value of the customer is more than 40
and the value of the customer is more than 50
then <action>.

This rule r contains many redundant tests t and could be simplified as follows without changing its meaning:
if the age of the customer is at most 10
and the value of the customer is more than 50
then <action>.

This rule r treats all the missing cases in the missing-case family mc1, but not more. There are other missing cases with a customer value greater than 50. Indeed, the existing rules r do not treat any customer with value greater than 50 and is independent of the customer age as shown by FIG. 1. Hence, the test t of the customer age is irrelevant and we can generalize the missing rule mr by removing this irrelevant test t. The resulting missing rule mr matches more missing cases and treats a larger missing case family mc.

Removing all irrelevant tests t results into a minimal description of a missing rule condition, i.e. a minimal set of tests t that are characterizing a set of missing cases. Each of the tests t in this minimal description of a missing-rule condition excludes at least one of the treated cases of rule project 1. Hence, no test t from the minimal missing rule condition can be removed without including some of the treated cases in the set of cases that satisfy the non-removed tests t. The result of this minimization step is thus a missing-rule condition that has a more general condition and that cannot be generalized further by removing tests t. In the considered first exemplary rule project 1, this results into a missing rule mr with a most general condition:
if the value of the customer is more than 50
then <action>.

Figure 2:
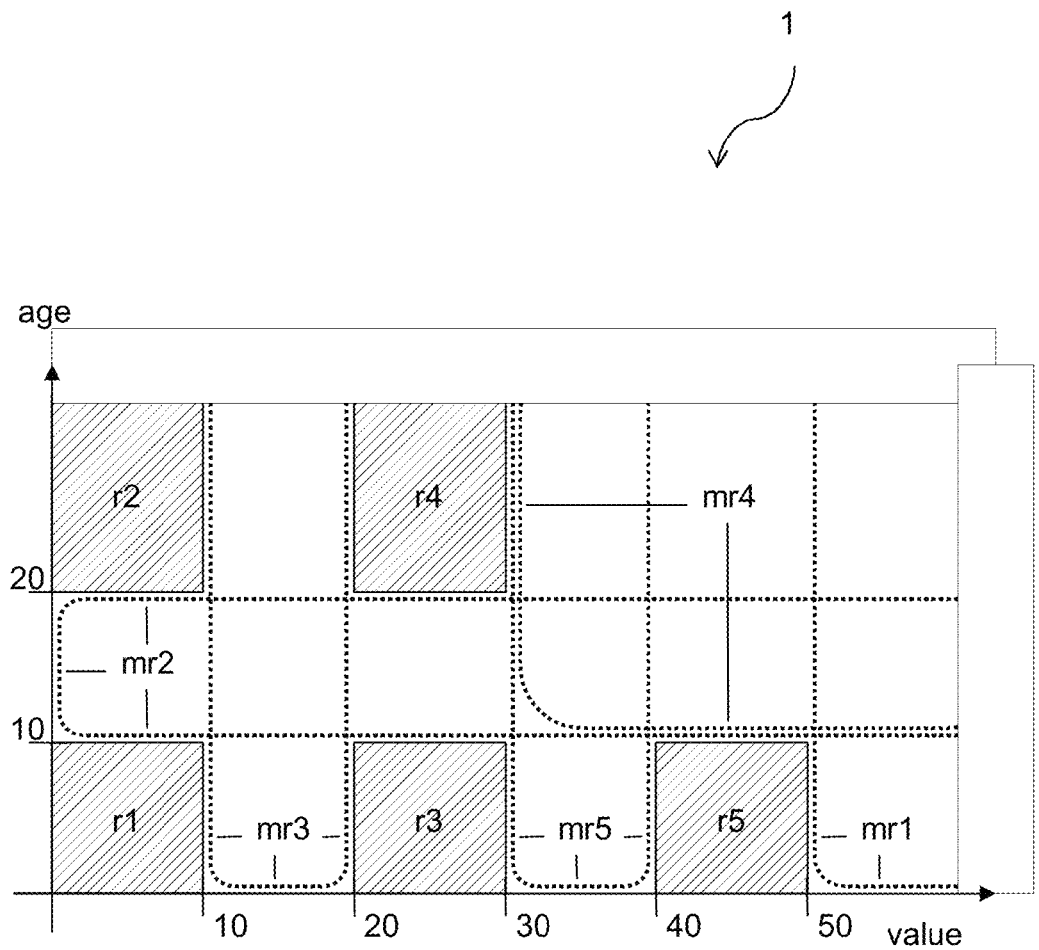
FIG. 2 shows the rule project of FIG. 1, whereby the missing case families have been replaced by most general missing rules.

Below can be seen all missing rules mr with most general conditions for rule project 1. They are also visualized in FIG. 2 and treat all the missing cases. This figure also shows that certain missing cases may match several missing rules mr. For example, the missing rules mr2, mr4, mr5 all treat the missing cases in family mc10 which are characterized by a value greater than 30 and smaller than 40 and an age greater than 10 and smaller than 20. Missing rules mr that share a missing case thus have overlapping conditions. These overlapping conditions are a consequence of the fact that the conditions of the considered missing rules mr are as general as possible. Overlapping conditions between rules only constitute a problem if the concerned rules r have contradictory actions. As information about the actions of the missing rules mr is not available, the detection and repair of conflicting actions is beyond the scope of this patent disclosure.

mr1
if the value of the customer is more than 50
then <action>
mr2
if the age of the customer is more than 10
and the age of the customer is less than 20
then <action>
mr3
if the value of the customer is more than 10
and the value of the customer is less than 20
then <action>
mr4
if the age of the customer is more than 10
and the value of the customer is more than 30
then <action>
mr5
if the value of the customer is more than 30
and the value of the customer is less than 40
then <action>

Figure 3:
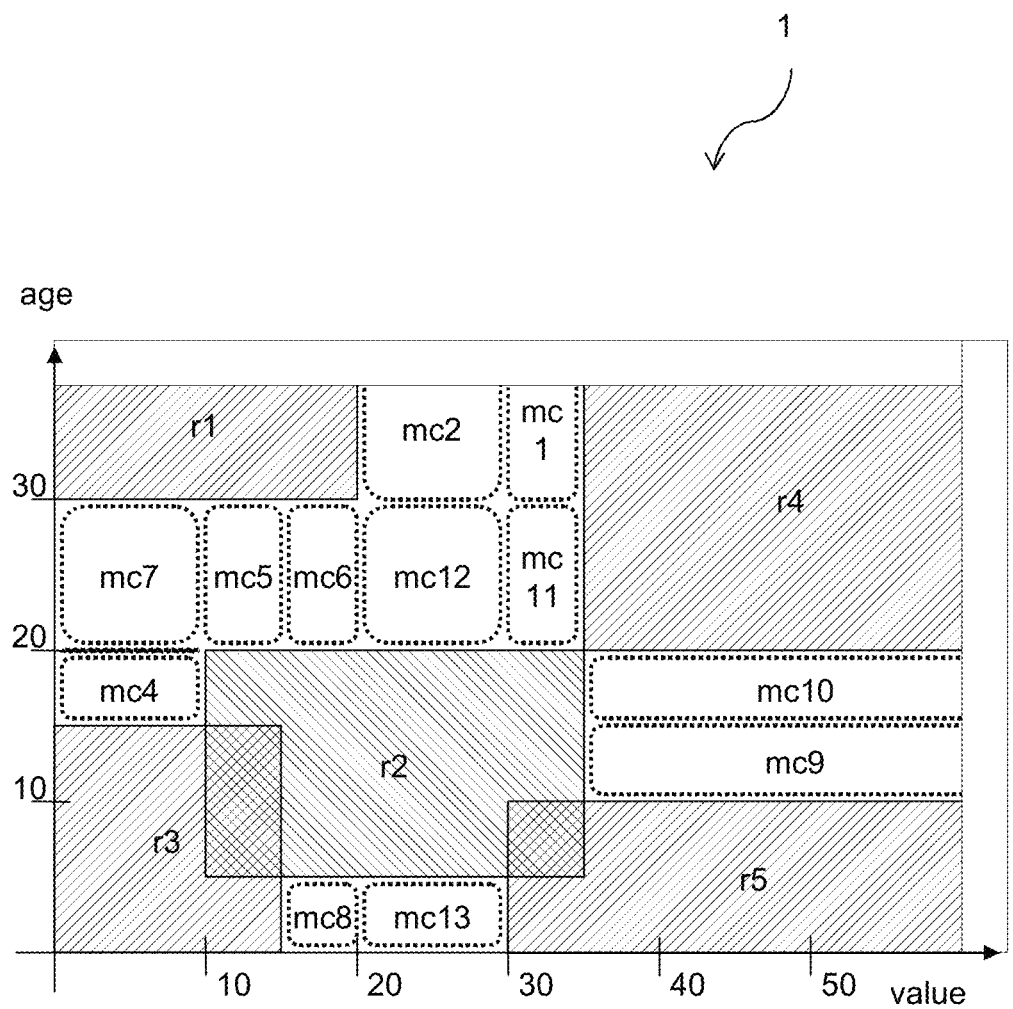
FIG. 3 shows a graphical representation of a second rule project with two objects and identified missing case families based on tests from the rules.
Figure 6:
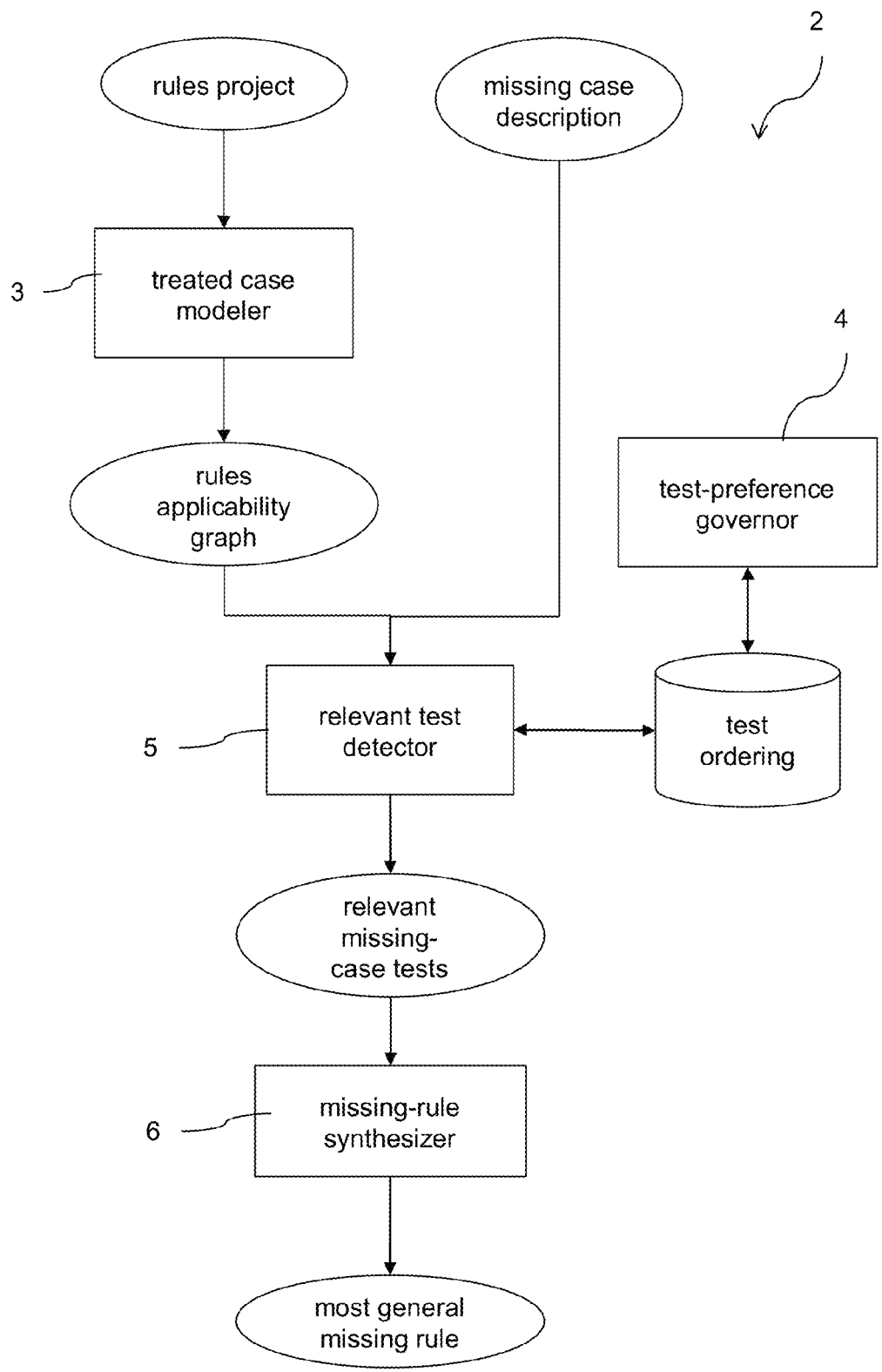
FIG. 6 shows a data flow diagram of a missing rule generator according to the invention.
Figure 7:
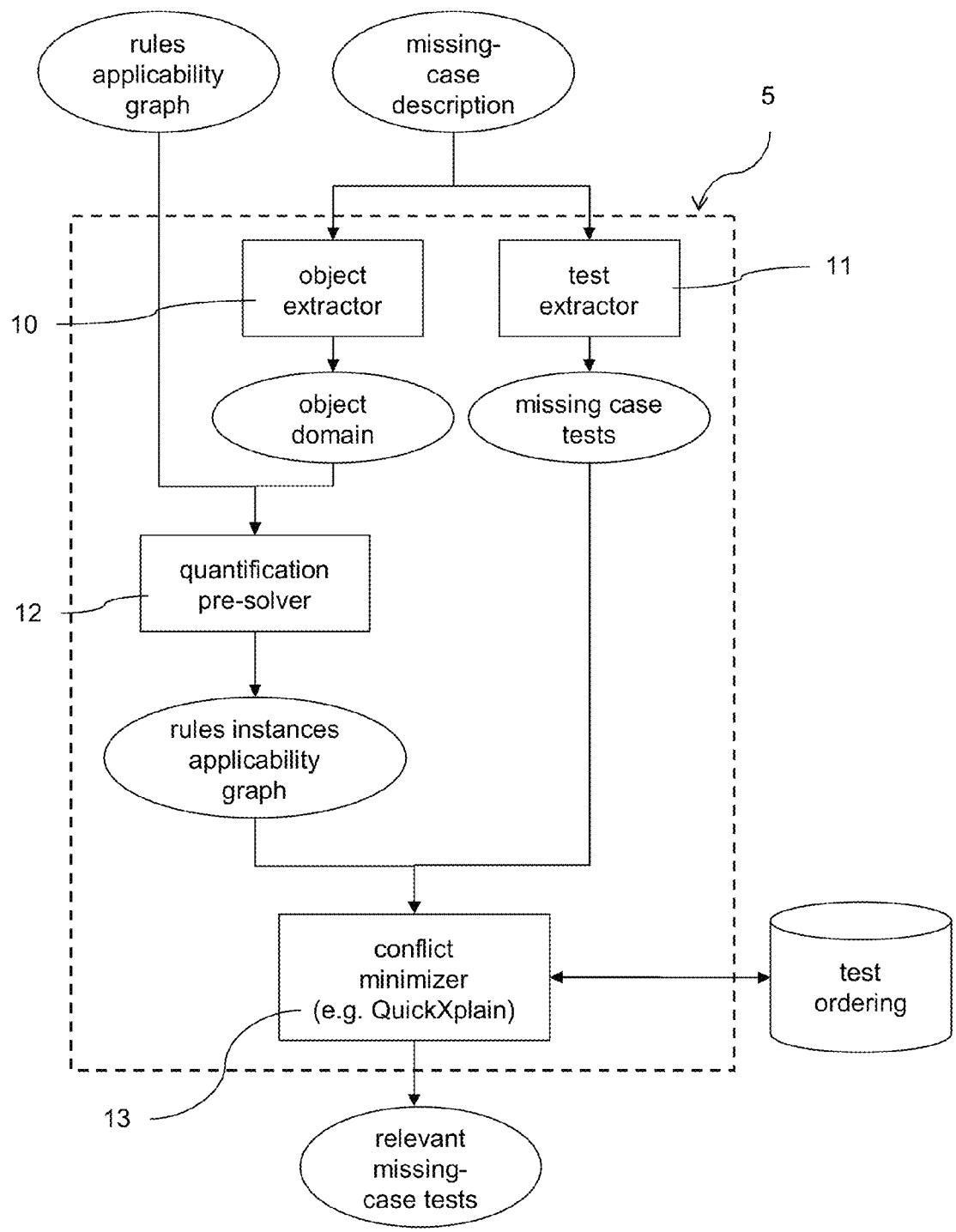
FIG. 7 shows a data flow diagram of a relevant test detector according to the invention.
Figure 13:
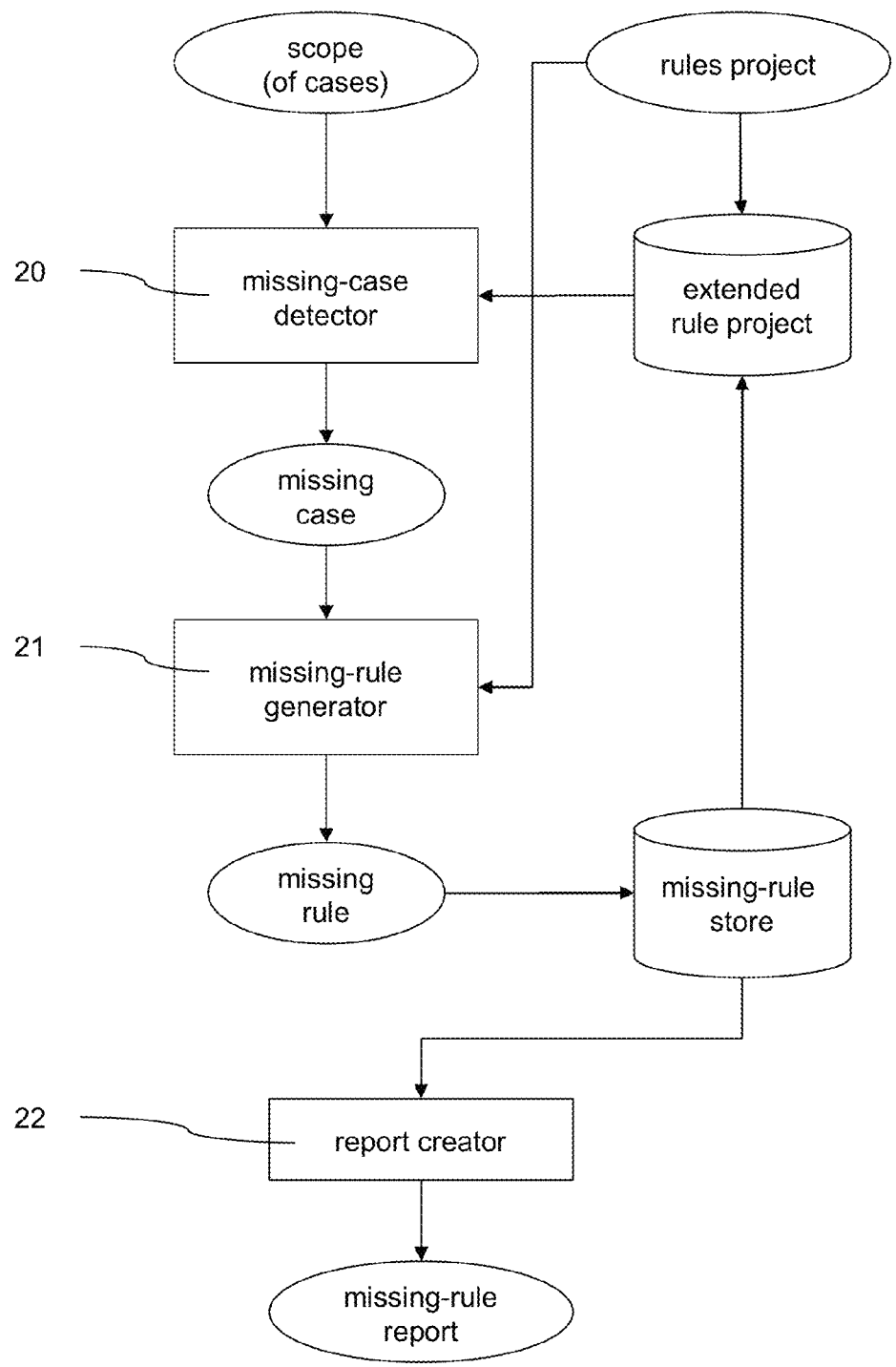
FIG. 13 shows a data flow diagram of a combination of a missing case detector and a missing rule generator.

Now referring to FIG. 3, a second exemplary rule project 1 can be seen. The rule project 1 comprises the following rules r after having removed disjunctions:
r1
if the age of the customer is at least 30 and
the value of the customer is at most 20
then set the category of the customer to "Gold";
r2
if the age of the customer is at least 5 and
the age of the customer is at most 20 and
the value of the customer is at least 10 and
the value of the customer is at most 35
then set the category of the customer to "Silver";
r3
if the age of the customer is at most 15 and
the value of the customer is at most 15
then set the category of the customer to "Silver";
r4
if the age of the customer is at least 20 and
the value of the customer is at least 35
then set the category of the customer to "Platinum";
r5
if the age of the customer is at most 10 and
the value of the customer is at least 30
then set the category of the customer to "Silver";

Evaluation of a set test t having a most general condition for the second exemplary rule project 1 is made with reference to a system 2, as shown in FIG. 6 and detailed out in FIGS. 7 and 13.

The overall system 2 can be seen in FIG. 6 and comprises a treated case modeler 3, a test preference governor 4, a relevant test detector 5, and a missing rule synthesizer 6. The treated case modeler 3 receives as input the rules project 1 and creates a rules applicability graph. The generation of a rules applicability graph is known in the art, e.g. from the aforementioned previous patent application ("Satisfiability For Detecting Missing Cases In Incomplete Business Rules Projects") of the same inventor.

The test preference governor 4 orders the tests t according to their most general condition, as explained later in detail.

The relevant test detector 5 receives the rules applicability graph and a missing case description, the latter generated as described in the above mentioned patent application. The relevant test detector 5 further receives the ordered tests t from the test preference governor 4 for the respective missing case. The output of the relevant test detector 5 is a set of relevant tests t for the missing case. The relevant test detector 5 comprises, as can be seen in FIG. 7, an object extractor 10, a test extractor 11, a quantification pre-solver 12, and a conflict minimizer 13. The object extractor 10 converts the missing case description into the object domain and provides this as input to the quantification pre-solver 12. The quantification pre-solver 12 further receives as input the rules applicability graph and generates a rules instances applicability graph. The test extractor 11 extracts tests t for the missing case from the missing case description. The tests t for the missing case and the rules instances applicability graph form the input for the conflict minimizer 13, which calculates under consideration of a test t ordering in respect to the most general condition a set of relevant tests t for the missing case.

Whereas the removal of irrelevant tests t is a necessary step for producing most-general missing rules mr, second exemplary rule project 1 shows that this step alone is not sufficient. FIG. 3 shows the cases treated by this rule project 1, and also depicts the missing case families mc of this rule project 1. For example, the missing case family mc5 contains all missing cases that satisfy the following tests:

t1: the age of Customer1 is less than 30
t2: the value of Customer1 is at most 20
t3: the age of Customer1 is at least 5
t4: the age of Customer1 is more than 20
t5: the value of Customer1 is at least 10
t6: the value of Customer1 is at most 35
t7: the age of Customer1 is more than 15
t8: the value of Customer1 is at most 15
t9: the age of Customer1 is at least 20
t10: the value of Customer1 is less than 35
t11: the age of Customer1 is more than 10
t12: the value of Customer1 is less than 30

The first step in generating a missing rule mr consists in identifying a minimal subset of relevant tests t. Whereas the missing-case family mc1 of the first exemplary rule project 1 has a unique minimal subset of relevant tests t, missing-case family mc5 of the second exemplary rule project 2 has multiple minimal sets. If tests t are removed starting from the end, we obtain the following minimal missing-rule condition:

t1: the age of Customer1 is less than 30
t2: the value of Customer1 is at most 20
t4: the age of Customer1 is more than 20

Test t4 is relevant since it eliminates cases that are treated by the rule project 1 and that satisfy the preceding tests t1 to t3. An example is the case where the customer value is 10 and the customer age is 10. Similarly, test t2 is relevant since it eliminates the treated case where the customer value is 35 and the customer age is 21, whereas the preceding test t1 as well as t4 are satisfying this case. Finally, test t1 is relevant since it eliminates the treated case that has a customer value of 10 and an age of 40, whereas t2 and t4 are satisfying this test. As there is no treated case that satisfies the tests t1, t2, and t4, all the other tests are irrelevant and could be removed. Hence, the tests t1, t2, and t4 constitute a minimal description of a missing rule condition and give raise to the following limited rule s3:

if the age of the customer is less than 30 and
the value of the customer is at most 20 and
the age of the customer is more than 20
then <action>.

Figure 4:
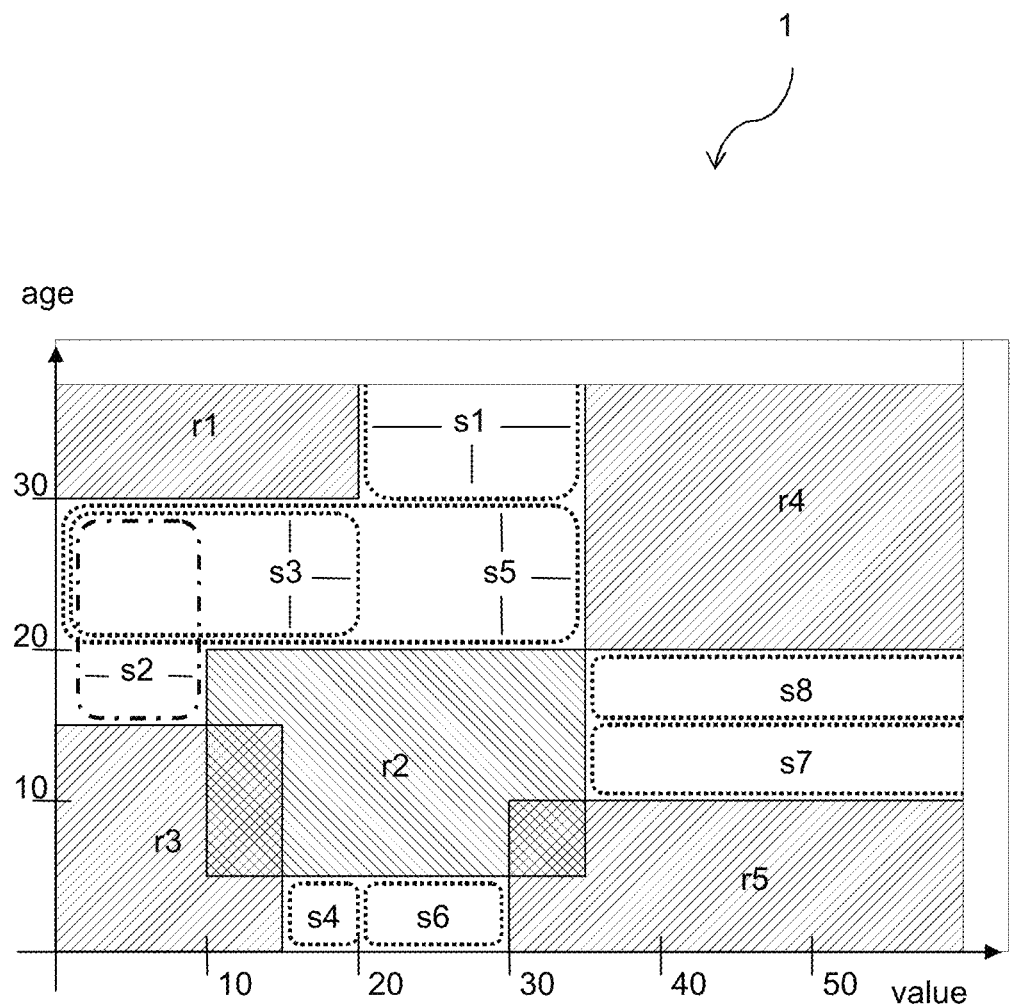
FIG. 4 shows the rule project of FIG. 3, whereby the missing case families have been replaced by limited rules.
Figure 5:
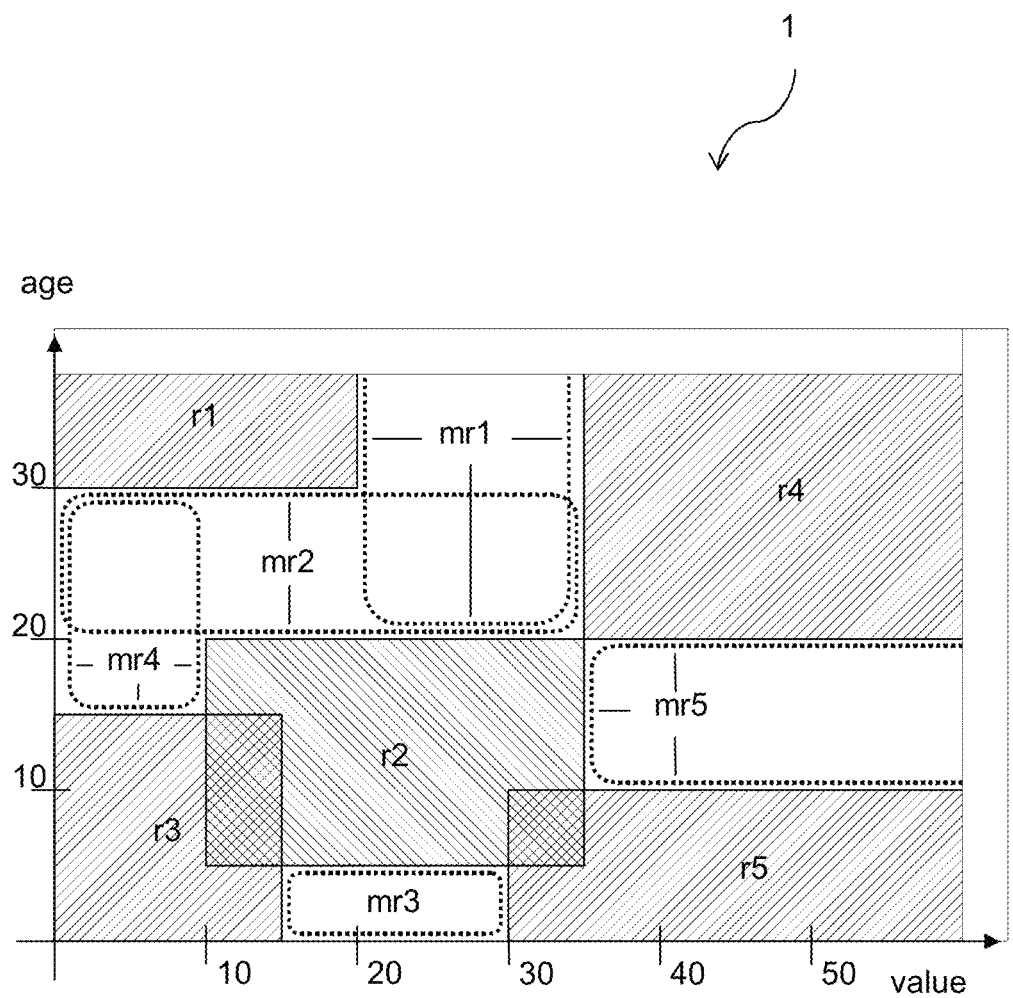
FIG. 5 shows the rule project of FIG. 3, whereby the missing case families have been replaced by most general missing rules.

Iterating this procedure for different missing cases leads to a set of limited rules s with minimal descriptions of conditions which generalize all the missing cases. FIG. 4 gives an example for such a set of limited rules s. Although the limited rules s have minimal descriptions of conditions, these conditions do not necessarily correspond to most general missing-case families mc. For example, the limited rule s5 has a more general condition than the limited rule s3 discussed above. Moreover, the limited rules s4 and s6 could be merged together into a more general missing rule mr and the same argument holds for limited rules s7 and s8. Furthermore, s1 does not have a most-general condition either. For comparison, FIG. 7 shows the expected missing rules mr having most-general conditions.

Whereas a naive test t elimination may create specialized rules r as in FIG. 4, this invention disclosure describes a system 2 for generating missing rules mr having conditions that are as general as possible. Missing rules mr as considered in this patent disclosure must not match any of the treated cases and must not use disjunctive combinations of tests t in their condition part. In order to produce most-general conditions, the missing-rule generator 22 not only eliminates irrelevant tests t, but it also imposes a suitable preference ordering of the tests t. In the example above, the test t10 ("the value of Customer1 is less than 35") is more general than the test t2 ("the value of Customer1 is at most 20") and will lead to a more general missing rule mr. However, as t2 precedes t10, the method described above eliminates t10 and keeps t2 as it prefers to keep tests t coming earlier in the given ordering. The missing-rule generator 22 computes most-general missing rules mr by giving preference to more general tests t. It therefore consists of two core components, namely the relevant-test detector 5 and the test-preference governor 4. Whereas the first component seeks the relevant tests t, the second component ensures that more general tests t are preferred. The missing-rule generator 22 takes as input a business rule project 1 and a description of a missing case family mc. The missing-case family mc describes cases of a fixed scope which are not treated by the given rule project 1. The missing-rule generator 22 generalizes this missing-case into a most-general condition of a missing rule mr. The missing-rule generator 22 can serve as a stand-alone module or as a sub-module of another service. In the first case, it reads its input in textual form from files or other similar sources and produces a missing-rule mr description in textual form. In the second case, the missing-rule generator 22 directly uses a representation of the rules r, the object model, and the missing-case family mc within a suitable data structure and produces a missing-rule mr description within a suitable data structure.

FIG. 6 shows the data-flow diagram of the missing-rule generator 22 and depicts the interactions between its components. The relevant-test detector 5 submits the current test t ordering to the test-preference governor 4 which inspects it and seeks violated preferences. The test-preference governor 4 then repairs the test t ordering such that it respects the test t preferences and sends it back to the relevant test detector 5. The relevant test detector 5 examines the tests t in the inverse order. As a result, it produces a set of relevant tests t, which describes a most-general missing-case family mc, as output. In order to find relevant tests t, the relevant-test detector 5 needs a description of the treated cases in a compact form. A further component, namely the treated-case modeler, provides this description. It uses the rules project 1 to construct a rules-applicability graph, i.e. a directed acyclic graph describing all the treated cases in form of constraints posed over the attributes of the objects matched by the rules r. Each node in the graph represents a distinct sub-expression of the constraint model and the single root node represents the whole constraint model. Graph edges link the nodes of the expressions with the nodes of their sub-expressions. In principle, it is possible to enumerate the treated cases by exploring different ways of labeling the rules-applicability graph with values and by retaining those labelings that solve the constraints, i.e. that respect the operations expressed by the graph nodes and that label the root node with the value "true". However, the relevant-test detector 5 only checks whether there is a treated case that additionally satisfies a tentative selection of tests t from the given missing-case family mc. It does this by temporarily adding these tests t to the rules-applicability graph and by checking whether the augmented graph has a solution or not. Once the relevant-test detector 5 has identified a minimal set of relevant tests t, it supplies it to the missing-rule synthesizer 6. This missing-rule synthesizer 6 produces a description of the missing-rule mr in an adequate rule language, which can e.g. be BAL language of the IBM Websphere ILOG JRules product.

The treated-case modeler 3 proceeds in the same line as the missing-case detector 20 (see patent application Ser. No. 12/898,359 entitled "Satisfiability For Detecting Missing Cases In Incomplete Business Rules Projects"). It constructs a rules applicability graph by recursively traversing the rules r in the given rule project 1 and by mapping each sub-expression of the rules r to a graph node. It guarantees a unique representation, i.e. two occurrences of the same sub-expression are mapped to the same graph node. The treated-case modeler 3 maps primitive expressions such as numbers or string literals to leaf nodes and it maps composed expressions such as arithmetic operations and comparisons to inner nodes which are labeled by the arithmetic or comparison operator and which have outgoing edges to the nodes that represent their sub-expressions. Similarly, the treated-case modeler 3 maps attribute accesses and method invocations to inner nodes that are labeled by the attribute or method and that have outgoing edges to nodes representing the concerned object and the other sub-expressions. Furthermore, the treated-case modeler 3 maps the objects matched by a rule r to leaf nodes that are labeled by uniformly named variables. For example, if a rule r1 matches two customer objects "x" and "y", then the modeler maps them to leaf nodes labeled by the variables "?customer1" and "?customer2". If another rule r2 matches a customer object "the customer", then the treated-case modeler 3 maps it to the existing leaf node labeled by the variable "?variable1". This variable renaming ensures that sub-expressions of different rules r are mapped to the same graph node if the sub-expressions just differ in the names of the matched objects. Finally, the treated-case modeler 3 introduces a graph node for each rule r that represents the conjunction of tests t of this rule r and that has outgoing edges to the nodes representing these tests t. The treated-case modeler 3 creates an applicability graph for a rule r by creating a further graph node which represents the existential closure of the conjunction of the tests t of the rule r. This node is labeled by the existential quantification of the variables that occur in the tests t of the rule r and has one outgoing edge to the node representing this conjunction of tests t. The treated-case modeler 3 then constructs the whole rules applicability graph by introducing a single root node representing the disjunction of the applicability graphs of the individual rules r. A labeling of the graph nodes that respect the operations of the nodes and that label the root node by "true" represents a treated case. Indeed, such a labeling will label the applicability graph of at least one rule by "true" and it will label the existentially quantified variables by objects such that these objects are in the working memory and satisfy the tests t of the rules r.

The relevant-test detector 5 generalizes a given missing-case family mc by identifying relevant tests t. It takes as input a description of a missing-case family mc, a rules applicability graph, and a preference ordering of the tests t as shown in FIG. 7. In a first step, the relevant-test detector 5 extracts the objects from the missing-case description and constructs an object domain. In the considered examples, this object domain just consists of the object Customer1.

As the missing case family mc describes cases of the given scope, this object domain will contain exactly one object for each type listed in this scope. In a second step, the relevant test detector 5 extracts the tests t from the missing-case description. The relevant test detector 5 determines a subset of relevant tests t such that no treated case of the scope satisfies all these relevant tests t. For this purpose, the relevant test detector 5 will examine different candidate sets of tests t and check whether they are satisfied by some treated case that has the given scope, i.e. consists only of the objects in the extracted object domain. Such a treated case exists if and only if there is a rule r in the rule project 1 that is applicable to the objects from the object domain while respecting the candidate tests t. To check the existence of such a rule r, the relevant test detector 5 creates a rules instance applicability graph. It uses its quantification pre-solver 12 for this purpose. If the applicability graph of a rule r has k existentially quantified variables, the quantification pre-solver considers all combinations of k objects from the object domain and creates an instance of the body of the existential quantification, i.e. the conjunction of tests t of the rule r, by replacing the variables by the chosen objects. The result is the applicability graph for a single instance of the considered rule r. The treated case modeler 3 then creates an applicability graph for all the instances of the rule by creating a node representing the disjunction of the applicability graphs of all the instances of the rule r. Furthermore, the quantification pre-solver 12 creates the rules instances applicability graph for the whole rule project 1 by creating a single root node that represents the disjunction of the rule instances applicability graph for all the rules r. When testing the existence of a treated case, the relevant test detector 5 temporarily augments this rule instances applicability graph by the candidate tests t in order to check whether there is a graph labeling that satisfies both the constraints in the rule instances applicability graph and the candidate tests t.

The quantification pre-solver 12 thus replaces an existentially quantified constraint by the disjunction of all the instances of the constraint. Another method for pre-solving the existentially quantified constraints uses skolemization and creates a single anonymous instance of each rule r by using new object identifiers which do not occur in the missing-case mc description or elsewhere in the rule r descriptions. For example, the variable "?customer1" is replaced by a single object "SkolemCustomer1". Additional constraints describe that this object is equal to some object in the object domain. For example, if the domain contains two objects "Customer1" and "Customer2", the following constraint states that "SkolemCustomer1" is equal to one of those objects: SkolemCustomer1=Customer1 or SkolemCustomer1=Customer2

These domain closure constraints ensure that the skolemization-based quantification pre-solver 12 produces results that are equivalent to that of the exhaustive quantification pre-solver 12 described above.

In the final, but most important step, the relevant test detector 5 seeks a minimal subset of tests t that does not include any of the treated cases. When adding those relevant tests t to the rules instance applicability graph, the resulting graph has no labeling that satisfies all of its constraints and that labels the root node by "true". Indeed, the combination of the tests t and the rules instances applicability graph is unsatisfiable, meaning that the tests t are in conflict with each other as soon as we assume that one of the rules r is applicable to the objects occurring in the missing case. Finding a minimal set of relevant tests t therefore amounts to the detection of a minimal set of conflicting tests t under the background constraint given by the rules instances applicability graph. The relevant test detector 5 therefore performs a conflict minimization in each last step. It supplies a conflict minimizer 13 such as QuickXplain with the missing-case tests t as foreground and the rules instances applicability graph as background. Details are described in the article "QuickXplain: Preferred Explanations and Relaxations for Over-Constrained Problems" from the inventor, which is also available at www.aaai.org/Papers/AAAI/2004/AAAI04-027.pdf and which is hereby incorporated by reference.

Figure 8:
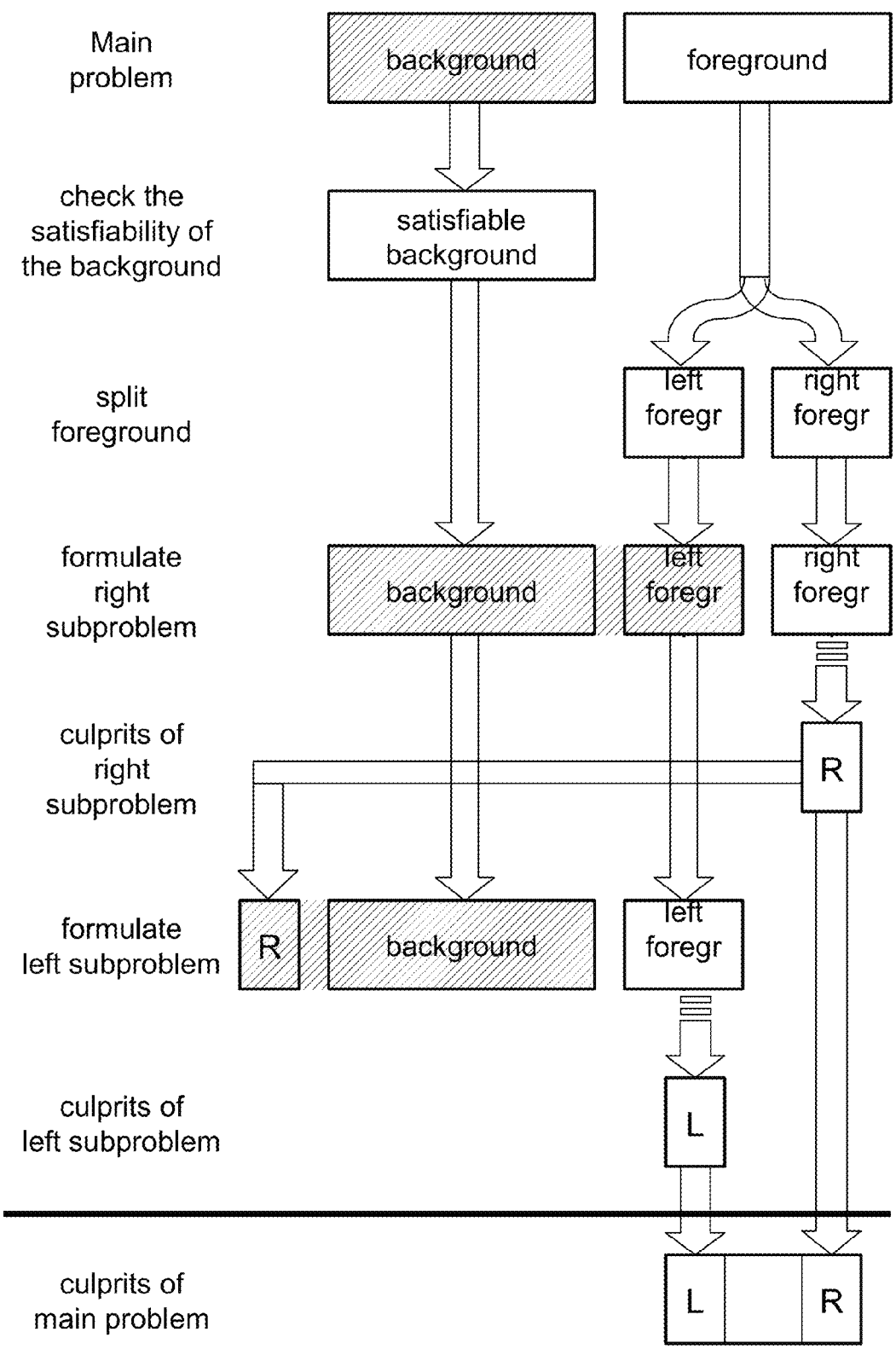
FIG. 8 shows a diagram showing the decomposition scheme of the conflict minimizer.

The QuickXplain method computes a minimal conflict, i.e. a minimal set of tests t from the given foreground that are conflicting under the given background constraints. Hence, the background constraints have no solution that satisfy all the tests t in the conflict, but when we remove an arbitrary test t from the conflict, then the background constraints have at least one solution that satisfies the remaining tests t. Therefore, all the tests t in the conflict are relevant for describing a missing-case family mc as the removal of any of them would include a treated case. QuickXplain solves the conflict minimization problem by successively decomposing it into smaller problems by moving constraints from the foreground to the background. Each of the subproblems thus has a proper foreground and a proper background. When solving a subproblem, QuickXplain first checks whether its background is satisfiable, i.e. has a solution. If this check fails, then none of the foreground constraints need to be added to obtain an inconsistency and QuickXplain returns the empty set as the resulting conflict. If the background is satisfiable, then some of the foreground constraints belong to the resulting conflict. If the foreground consists of a single test t, then this test t is a culprit, i.e. belongs to the resulting conflict. As the foreground contains no other test t, QuickXplain returns the set that contains the detected culprit as the resulting conflict. If the foreground consists of multiple tests t1, . . . tn, then QuickXplain divides the foreground into a left foreground t1, . . . , tk and a right foreground tk+1, . . . , tn by choosing an adequate split point k. A standard strategy consists in splitting in the middle (k=n/2) or just before the end (k=n−1). QuickXplain seeks the culprits among the right foreground by setting up a right subproblem. For this purpose, it moves the left foreground into the background in order to define the background of the right subproblem and it chooses the right foreground as foreground of the right subproblem. Solving this right subproblem produces right culprits R. Next, QuickXplain seeks for the culprits among the left foreground by setting up a left subproblem. For this purpose, QuickXplain restores the original background and then moves the right culprits to the background in order to define the background of the left subproblem. Furthermore, it chooses the left foreground as foreground of the left subproblem. Note that it omits the satisfiability check for the left subproblem, if its background is equal to the original background. Solving this left subproblem produces left culprits L. In the final step, QuickXplain combines the left and right culprits and returns the union of these sets as the resulting conflict. FIG. 8 depicts this decomposition scheme graphically.

It may happen that some of the satisfiability checks cannot be completed within a given time limit. In this case, it has not been proved that the background of the considered subproblem is unsatisfiable and QuickXplain will not be able to return an empty conflict set. Hence, time limits may lead to solutions, which are not minimal, but they don't prevent the relevant test detector 5 from returning a valid result.

This invention disclosure provides a further innovation as it shows how to generalize missing-case families mc by minimizing conflicts. It also introduces a particular split-and-check strategy in order to solve these problems efficiently. Whereas QuickXplain is effective for finding conflict sets of small size, it may double the number of satisfiability checks if nearly all tests t in the foreground belong to the resulting conflict set. Indeed, it needs $2n$ satisfiability checks if all n tests t belong to the conflict, whereas a simpler method removes each test t on a tentative basis and checks whether the resulting set is satisfiable, thus needing only n checks.

Figure 9:
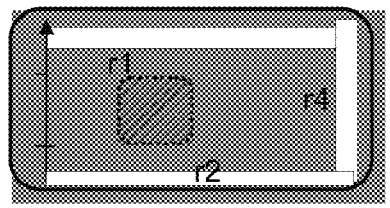
FIG. 9 shows a process of generalization of a missing case family into a missing rule for the second rule project with a set of tests in an initial order.
Figure 9:
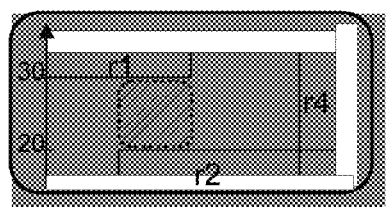
Figure 9:
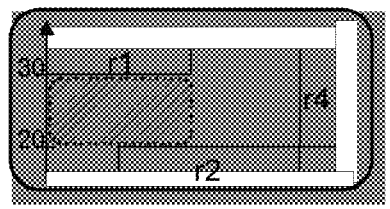
Figure 9:
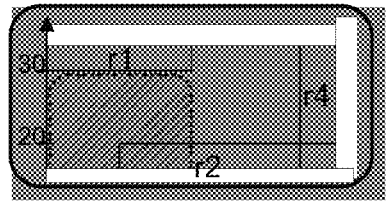
Figure 9:
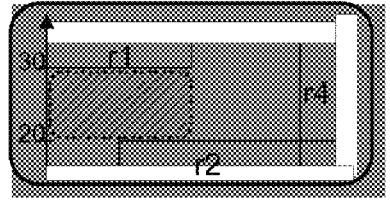
Figure 9:
Figure 9:
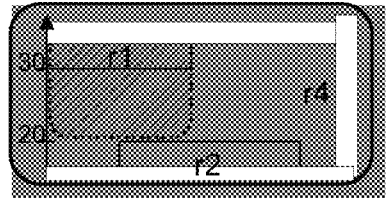
Figure 9:
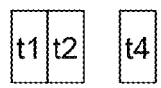
Figure 11:
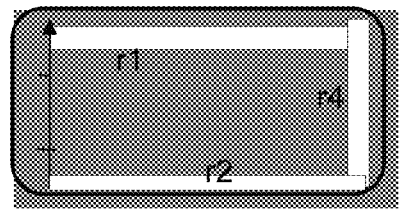
FIG. 11 shows a first part of a process of generalization of a missing case family into a missing rule for the second rule project with a sorted set of tests.
Figure 11:
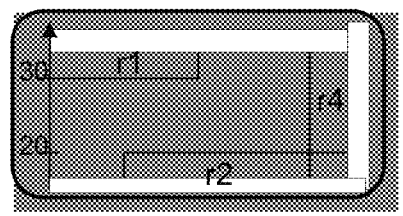
Figure 11:
Figure 11:
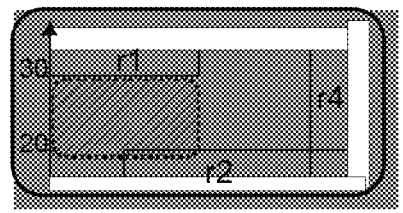
Figure 11:
Figure 11:
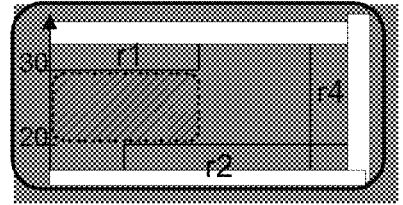
Figure 11:
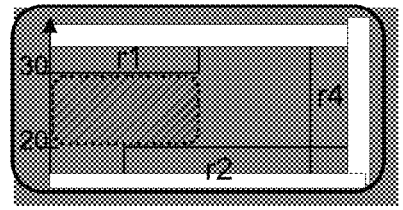

This behavior can be achieved by splitting foregrounds before the end (at n−1) and by omitting the satisfiability check of the background for subproblems that have a splittable foreground, i.e. a foreground of containing more than one test t. However, this lazy strategy will need n checks in all cases, whereas the original strategy significantly reduces the number of satisfiability checks if it encounters subproblems with unsatisfiable backgrounds and large foregrounds which it solves through one check only. This invention disclosure therefore introduces a mixed strategy which treats large and small foregrounds differently. If the size of the foreground exceeds a given splitting threshold, the mixed strategy will split the foreground in the middle and check the satisfiability of the backgrounds of the resulting subproblems as it might reduce effort significantly if one of those backgrounds is unsatisfiable. However, if the size of the foreground is smaller than the splitting threshold, but greater than 2, then the mixed strategy splits just before the end, i.e. divides the foreground into a left foreground of size n−1 and a right foreground of size 1. It then skips the satisfiability check for the left subproblem as its foreground is not large enough such that the cost of the satisfiability check may pay off. Finally, if the foreground has exactly two elements, there is no other way than splitting in the middle and the satisfiability checks must be done for the left and the right subproblems since their foregrounds contain only one element. In summary, the mixed strategy only performs the satisfiability checks if necessary, i.e. for foregrounds of size 1, or when the check may pay-off, i.e. for foregrounds of sizes that exceed half of the splitting threshold. The mixed strategy is illustrated for the problem of finding the relevant tests among the missing-case family mc5 of the second exemplary rule project 1. This missing-case family mc5 is described by the tests t1, . . . , t12 as explained above. When using a splitting threshold of 8, the relevant test detector 5 will perform the satisfiability checks shown in FIG. 11. The figure omits the satisfiability check of the original background B0 as it is trivially satisfied. The conflict minimizer then splits the foreground t1, ..., t12 in the middle since its size exceeds the splitting threshold of 8. It then checks whether any of the treated cases satisfies the background B0, t1, ..., t6 of the right subproblem. The right part of FIG. 9 shows that none of the cases which satisfy t1, ..., t6 makes any of the rules applicable. As a consequence, t1, ..., t6 are sufficient to describe the missing-case family mc and the foreground t7, ..., t12 has the empty set as conflict. After that, the conflict minimizer 13 moves t1, ..., t6 into the foreground and restores the original background. As no right culprit has been found, this background remains unchanged. The conflict minimizer 13 already knows that it is satisfiable and does not need to check this again. As the foreground has a size smaller than the splitting threshold, the conflict minimizer 13 splits the foreground before the end into the left foreground t1, ..., t5 and the right foreground t6. The right subproblem has the background B0, t1, ..., t5, which is unsatisfiable again. Things are repeated until the conflict minimizer encounters the subproblem with background B0, t1, t2, t3 and the foreground t4. The cases described by the tests t1, ..., t3 contain a treated case, meaning that the background B0, t1, t2, t3 is satisfiable and that the foreground contains a culprit, which cannot be any other test than t4. The conflict minimizer then moves this culprit to the background B0 and encounters the subproblem with background B0, t4 and foreground t1, t2, t3. It omits the satisfiability check of the background since the foreground is too small. The conflict minimizer 13 carries out three further satisfiability checks, namely for the subproblem with background B0, t4, t1, t2 and foreground t3, for the subproblem with background B0, t4, t1 and foreground t2 and for the subproblem with background B0, t4, t2 and foreground t1 as indicated in FIG. 11. This figure well demonstrates the effectiveness of the mixed strategy.

Whereas the conflict minimizer 13 computes the expected set of relevant tests, this set does not correspond to a most-general condition of a missing rule mr. This problem occurs since the more specific test t2 ("the value of Customer1 is at most 20") precedes the more general test t10 ("the value of Customer1 is less than 35"). As the conflict minimizer 13 prefers earlier tests t, it eliminates later tests t first. Indeed, the initial ordering of the tests t ignores the preference of test generality. A separate system, namely the test-preference governor 4 ensures that these preferences are respected. The test-preference governor 4 inspects the initial ordering of the tests t in the foreground and repairs it. More general tests t will precede more specific tests t in the repaired test t ordering. This concerns only strict preferences as the order of equivalent tests t such as "x+y>=20" and "x>=20-y" is not important. However, it is not sufficient to compare individual tests t as there may be logical dependencies between multiple tests t. For example, consider three tests ordered as follows: (i) "x>=10", (ii) "y>=10", (iii) "x+y>=20". If the relevant test detector 5 will ever select the first test "x>=10" as a relevant test t, then the second test "y>=10" will entail the third test "x+y>=20" under this background constraint. Hence, the third test t is more general than the second test t and should be preferred whenever this situation arises. Hence, the test preferences are conditional and depend on other relevant tests. As these relevant tests t are not known in advance, a look-ahead policy is necessary. This policy ensures for each subproblem encountered by the conflict minimizer 13 that the foreground of the subproblem does not contain any test t that is strictly preferred to any test t in the background supposing that the background constraints have been selected.

As the conflict minimizer 13 does not know in advance the subproblems it will encounter, the test-preference governor 4 will establish a test ordering such that no test t is strictly preferred to any preceding tests t under these preceding tests t and additional background tests t. The test-preference governor 4 therefore takes as input an ordering of foreground tests t as well as a set of background tests t. The conflict minimizer 13 invokes the test-preference governor 4 in its initial step when it solves the whole conflict minimization problem. It submits an empty background and the current ordering of the tests t in the foreground. The test-preference governor 4 then returns a repaired ordering which will respect the look-ahead policy for a large amount of conflict minimization subproblems. When it comes to splitting, then the right subproblem will automatically satisfy the look-ahead policy since all tests t in the background of the right subproblem precede the tests t in its foreground. The left subproblem will automatically satisfy the look-ahead policy if the conflict minimizer 13 has not found any culprit within the right subproblem. If a subproblem does not automatically satisfy the look-ahead policy, then the conflict minimizer 13 needs to re-invoke the test-preference governor 4 for this subproblem. It provides the tests t of the foreground of the subproblem in their current ordering as the foreground of the test-preference governor 4 and the tests t in the background of the subproblem as background of the test-preference governor 4. However, it will not send the original background which models the treated cases to the test-preference governor 4 as the treated cases must not intervene in the detection of preferences between the missing-case tests t. Hence, the conflict minimizer 13 invokes the test-preference governor 4 in its initial step and for each left subproblem which received culprits from its right subproblem.

The test-preference governor 4 constructs the repaired test ordering in several iterations. It constructs this ordering from the end. In each iteration, it seeks a test t that is well-placed in the existing test ordering of the foreground. It removes this test from the foreground and adds it to the start of the repaired test ordering. To find such a well-placed test t, the test-preference governor 4 inspects the tests t in the foreground in the inverse order starting from the last one. When it inspects a test t, it determines whether the preceding tests t in the foreground and the background together entail this test t. To perform this entailment check, the test-preference governor 4 creates the conjunction of the preceding tests t in the foreground, of the background, and of the negation of the inspected test t. It submits this conjunction to a constraint solver, which is not explicitly shown in the figures. If the constraint solver has proved that the conjunction has no solution, then the inspected test t is entailed by the other constraints. For example, the test t2 (the value of Customer1 is at most 20) entails the test t10 (the value of Customer1 is less than 35). As this entailment check does not involve the complex constraints modeling the treated cases, it is less costly than the satisfiability checks performed by the conflict minimizer 13. As such, the number of entailment checks is not as important as the number of those satisfiability checks.

Now if the inspected test t is entailed by the preceding tests t in the foreground and the background, then it is more general than some of the preceding tests in the foreground under the constraints expressed by these preceding tests t and the background. As the current test t is preferred to such a test t, but succeeds it in the test ordering, it is ill-placed. However, if the current test t is not entailed by the preceding tests t in the foreground and the background, then it is not preferred and therefore well-placed in the test ordering. Once the test-preference governor 4 finds such a non-preferred test t, it ranks this test t by removing it from the foreground and by adding it to the repaired ordering. It has then finished the current iteration and starts a new one. In each iteration, the foreground shrinks by one element, meaning that the whole process stops once the test preference governor 4 has ranked all elements.

It may happen that some of the entailment checks are not completed within a given time limit. In this case, it has not been proved that the preceding tests t in the foreground and the background entail the inspected test t. As a consequence, the inspected test t remains ill-placed in the repaired ordering and potentially prevents the relevant test detector 5 from finding a most-general missing-case family mc. However, the time limit only impacts generality. It does not prevent the relevant test detector 5 from providing a valid result.

Figure 10:
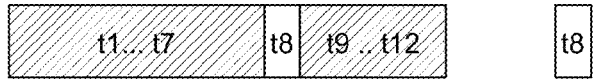
FIG. 10 shows a process of sorting the test in respect of the broadest coverage.
Figure 10:
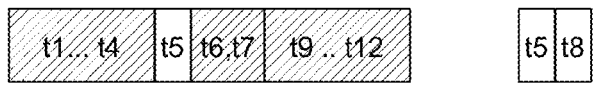
Figure 10:
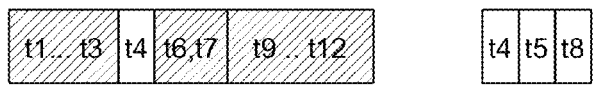
Figure 10:
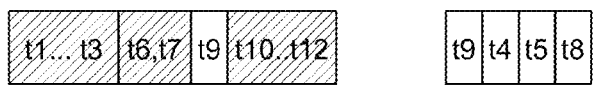
Figure 10:
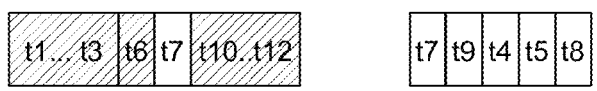
Figure 10:
Figure 10:
Figure 10:
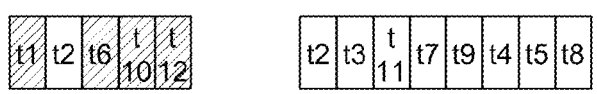
Figure 10:
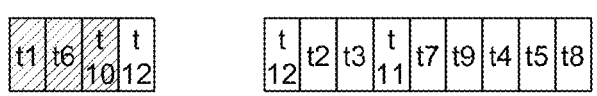
Figure 10:
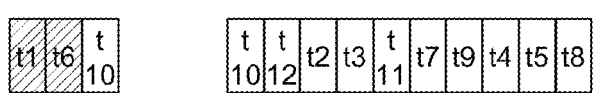
Figure 10:
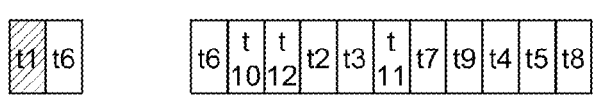
Figure 10:
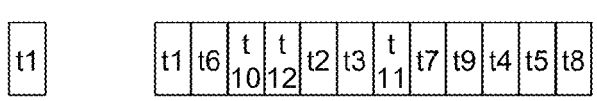
Figure 10:
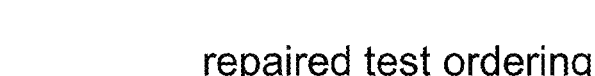

FIG. 10 shows the iterations of the test-preference governor 4 when it repairs the test ordering of the missing-case family mc5 of rule project 2. The first line shows the first iteration. The test-preference governor 4 inspects the tests t in the original test ordering starting from the last test t until it finds a well-placed test t. The tests t12, t11, t10, and t9 are all more general than their preceding tests t. For example, each of the tests t12 ("the value of Customer1 is less than 30") and t10 ("the value of Customer1 is less than 35") is more general than the preceding test t2 ("the value of Customer1 is at most 20"). And each of the tests t11 ("the age of Customer1 is more than 10") and t9 ("the age of Customer1 is at least 20") is more general than the test t4 ("the age of Customer1 is more than 20"). The test t8 ("the value of Customer1 is at most 15") is the last test t in the original test ordering which is well-placed. The test-preference governor 4 therefore finds this test t first and ranks it. In the second iteration, the test-preference governor 4 again seeks the last well-placed test t in the now reduced ordering of the foreground tests t. The ranking of t8 did not impact the fact that t12, . . . , t9 are ill-placed. The test t7 ("the age of Customer1 is more than 15") is more general than the preceding test t4 ("the age of Customer1 is more than 20"). Furthermore, the test t6 ("the value of Customer1 is at most 35") is more general than t2 ("the value of Customer1 is at most 20"). However, the next candidate, namely t5 ("the value of Customer1 is at least 10") is well-placed and gets ranked. Repeating these steps leads to the following repaired ordering.

t1: the age of Customer1 is less than 30
t6: the value of Customer1 is at most 35
t10: the value of Customer1 is less than 35
t12: the value of Customer1 is less than 30
t2: the value of Customer1 is at most 20
t3: the age of Customer1 is at least 5
t11: the age of Customer1 is more than 10
t7: the age of Customer1 is more than 15
t9: the age of Customer1 is at least 20
t4: the age of Customer1 is more than 20
t5: the value of Customer1 is at least 10
t8: the value of Customer1 is at most 15

None of the tests t in this ordering is ill-placed, i.e. none of the tests t is preferred to any of the preceding tests t. Moreover, all tests t are unary, i.e. concern a single attribute and there are no complex logical dependencies between tests t which lead to the problem of conditional preferences explained above. As a consequence, the repaired ordering is valid for all subproblems encountered by the conflict minimizer 13 in this particular setting.

Figure 12:
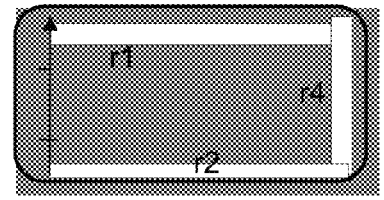
FIG. 12 shows a second part of a process of generalization of a missing case family into a missing rule for the second rule project with a sorted set of tests.
Figure 12:
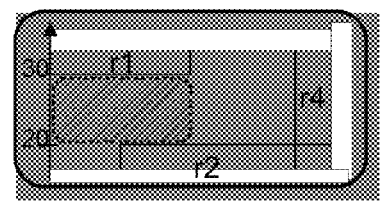
Figure 12:
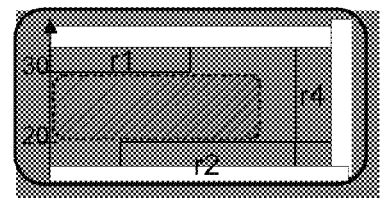
Figure 12:
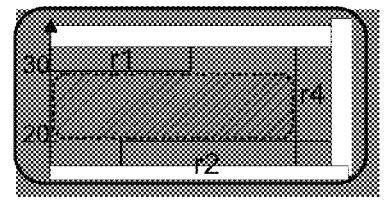
Figure 12:
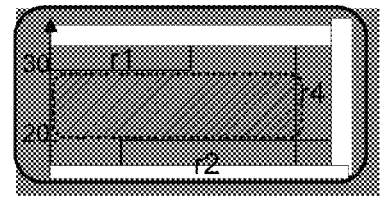
Figure 12:
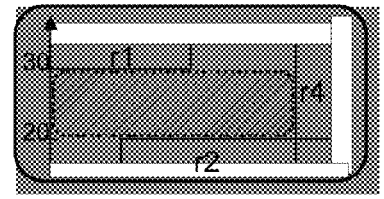
Figure 12:
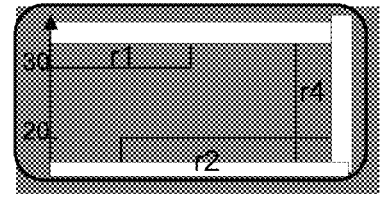

FIGS. 11 and 12 show the impact of the repaired ordering on the operations of the conflict minimizer 13. The general test t10 ("the value of Customer1 is less than 35") now precedes the specific test t2 ("the value of Customer1 is at most 20") and the conflict minimizer 13 therefore prefers it. As a consequence, it selects a different set of relevant tests t, namely t1, t4, and t10 instead of t1, t2, and t4. The new set of relevant tests t leads to the missing rule mr2 in FIG. 7 which has a more general condition than the missing rule s3 in FIG. 6, which corresponds to the original set of relevant tests t. This example well illustrates the synergy between the relevant test detector 5 and the test-preference governor 4. The test-preference governor 4 instruments the relevant test detector 5 in such a way such that the relevant test detector 5 relaxes the tests t in the right order and finds the tests t that characterize a most-general missing-case family mc.

Once the relevant test detector 5 has found a generalized missing-case family mc it sends it to the missing rule synthesizer 6. The missing rule synthesizer 6 uses the tests t of the missing case family mc to create a missing rule mr. It adds a definition-clause for each of the objects occurring in the tests t and adds an empty action. Finally, it renders the missing rule mr in the syntax of the target language such as the business action language of IBM Websphere Ilog JRules 7.x. For example, it transforms the missing-case family mc defined by the tests t1, t4, and t10 into the missing rule mr:
definitions set Customer1 to a Customer
if the age of Customer1 is less than 30 and
the age of Customer1 is more than 20 and
the value of Customer1 is less than 35
then <action>.

As there is a single object of type Customer1, the missing rule synthesizer 6 may also avoid the introduction of a definition clause for this object and replace it by the generic term "the customer". This leads to an equivalent missing rule mr:
if the age of the customer is less than 30 and
the age of the customer is more than 20 and
the value of the customer is less than 35
then <action>.

The missing rule synthesizer 6 then returns this most general missing rule mr as its result.

FIG. 13 shows the complete picture which combines a missing-case detector 20, and a missing-rule generator 21 in a way that permits to find a sufficient set of most-general missing rules mr. The missing-case detector 20 detects missing cases as already described in advance and the missing rule generator 21 comprises the aforementioned relevant test detector 5 and the missing rule synthesizer 6.

In this sufficient set of most-general missing rules mr, each missing case is handled by at least one missing rule mr. As explained by FIG. 13, the missing-case detector 20 takes as input an extended rule project 1 and a definition of the scope of the considered cases, i.e. a configuration of objects of fixed type. The extended rule project 1 includes the rules r from the given rule project 1 as well as the missing rules mr that have been found by the combined system. Given this information, the missing-case detector 20 seeks a missing case family mc of the given scope among the rules r of the extended rule project. It supplies this result to the missing-rule generator 21 which generalizes the missing-case family mc into a missing rule mr having a most general condition. The missing-rule generator 21 takes into account the rules r of the given rule project 1, but not the missing rules mr that have already been found. If it took these missing rules mr into account, it would ensure that newly generated missing rules mr do not overlap with previously generated missing rules mr. As a consequence, the newly generated missing rules mr will not have most-general conditions. Hence, the combined system of FIG. 13 provides feed-back about missing rules mr to the missing-case detector 20, but not to the missing-rule generator 21. Thanks to this distinction, it is able to generate all the most-general missing rules mr of the rule projects 1 according to FIG. 3 and to FIG. 7. A report creator 22 creates a report containing all missing rules mr.

This system is also capable of generating missing rules mr for rule projects 1 that have a rule flow. Such a rule flow consists of several rule tasks representing different steps of the decision making process. Each rule task contains a subset of the business rules r and treats only certain of the cases. The combined missing-case detector 20 and missing-rule generator 21 will then generate the missing rules mr task by task, taking only into account the rules r of the selected task.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A method performed by a computer for detecting missing rules with most general conditions in a rule project comprising rules having a given scope with a fixed number of objects of a given type, the method comprising the steps of:

the computer finding at least one missing case not covered by the rules;

the computer identifying tests that occur in the rules;

the computer generalizing the at least one missing case into a family of missing cases in terms of the tests that occur in the rules;

the computer generalizing the family of missing cases into a missing rule; and the computer generating missing rules with most general conditions, wherein the step of generalizing the at least one missing case into the family of missing cases in terms of the tests that occur in the rules comprises finding a minimal set of tests that cover the family of missing cases but do not cover any cases covered by the rules, and wherein the step of finding the minimal set of tests that cover the family of missing cases but do not cover any of the cases covered by the rules comprises:

ordering the tests according to broadest coverage of an object; and stepping through the tests ordered and verifying whether a selected test covers any case covered by the rules.

2. The method according to claim 1, further comprising a step of splitting rules having disjunctions in a condition into a set of rules without disjunctions and having a same coverage.

3. The method according to claim 1, wherein the step of generalizing the at least one missing case into the family of missing cases in terms of the tests that occur in the rules further comprises removing irrelevant tests in respect to the family of missing cases.

4. The method according to claim 1, wherein the step of generalizing the at least one missing case into the family of missing cases in terms of the tests that occur in the rules further comprises ordering the tests according to broadest coverage of an object.

5. The method according to claim 1, wherein the step of finding the minimal set of tests that cover the family of missing cases but do not cover any of the cases covered by the rules further comprises separating the tests into two groups and verifying if one group of the tests creates an overlap with existing rules and, in case no overlap is created, taking solely this group of tests for further processing.

6. The method according to claim 1, wherein the step of finding the minimal set of tests that cover the family of missing cases but do not cover any of the cases covered by the rules further comprises applying a timeout at a beginning of the finding step and taking a current set of tests as the minimal set of tests at expiry of the timeout.

7. The method according to claim 1, wherein the method is applied to all missing cases of the rules project.

8. The method according to claim 7, wherein the step of finding at least one missing case not covered by the rules further comprises finding at least one missing case not covered by the rules of the rules project and already identified missing rules.

9. The method according to claim 1, wherein each rule in the rule project is defined by at least one test in respect to at least one condition of at least one attribute of an object of the fixed number of objects.

* * * * *